United States Patent [19]

Oguchi et al.

[11] Patent Number: 5,202,879
[45] Date of Patent: Apr. 13, 1993

[54] INFORMATION RECORDING MEDIUM, AND INFORMATION RECORDING AND/OR REPRODUCING METHOD AND APPARATUS

[75] Inventors: Takahiro Oguchi, Atsugi; Kunihiro Sakai, Isehara; Hiroyasu Nose, Zama; Ryo Kuroda, Machida; Akihiko Yamano, Yokohama, all of Japan

[73] Assignee: Canon Kabushiki Kaisha, Tokyo, Japan

[21] Appl. No.: 789,321

[22] Filed: Nov. 8, 1991

[30] Foreign Application Priority Data

Nov. 13, 1990 [JP] Japan ................................ 2-307911

[51] Int. Cl.$^5$ ............................................. G11B 9/00
[52] U.S. Cl. ........................................ 369/126; 369/43; 365/151; 250/306; 250/307
[58] Field of Search ..................... 369/126, 93, 47, 43; 365/151; 250/306, 307

[56] References Cited

FOREIGN PATENT DOCUMENTS 63-161552 7/1988 Japan .
63-161553 7/1988 Japan .

OTHER PUBLICATIONS

Binnig, et al., "Scanning Tunneling Microscopy," Helvetica Physica Acta, vol. 55, 1982, pp. 726 through 735.
Binning, et al., "Single-Tube Three-Dimensional Scanner for Scanning Tunneling Microscopy," Rev. Sci. Instrum. vol. 57, No. 8, Aug. 1986, pp. 1688 to 1689.

Primary Examiner—Jack I. Berman
Attorney, Agent, or Firm—Fitzpatrick, Cella, Harper & Scinto

[57] ABSTRACT

In an information recording medium where information is recorded and/or reproduced by a probe performing relative scanning, an information region for detecting abnormality of the probe is provided separate from a region where information is recorded and/or reproduced. Also disclosed is an information recording and-/or reproducing method for recording information on and/or reproducing information from an information recording medium while relatively scanning the recording medium by a probe, which includes a step of detecting abnormality of the probe by detecting a predetermined information region separated from a region where the information is recorded and/or reproduced on the information recording medium. Also disclosed is an information recording and/or reproducing apparatus for recording information on and/or reproducing information from an information recording medium while relatively scanning the information recording medium by a probe, which includes an abnormality detection device for detecting abnormality of the probe according to a result of a detection by the probe of a predetermined information region separated from a region where the information is recorded and/or reproduced on the information recording medium.

30 Claims, 5 Drawing Sheets

INFORMATION RECORDING MEDIUM, AND INFORMATION RECORDING AND/OR REPRODUCING METHOD AND APPARATUS

BACKGROUND OF THE INVENTION

1. Field of the Invention

This invention relates to an information recording medium, an information recording and/or reproducing method, and an information recording and/or reproducing apparatus.

2. Description of the Related Art

Various kinds of high-density recording methods have been known. Magnetic recording and optical recording are typical among such methods. In magnetic recording, a recording wavelength is determined according to the restriction of a device, such as a magnetic head or the like, used in a recording and reproducing operation. A recording wavelength of about 1 µm is a limit in magnetic recording. In optical recording, a recording wavelength is limited by the diameter of a light beam used in a recording and reproducing operation. A wavelength of about 1-0.5 µm is a limit in optical recording.

Recently, STM's (scanning tunnel microscopes) have been developed. In an STM, the state of the surface of a solid can be analyzed with a horizontal resolution of a few Angstroms and a vertical resolution of at least one Angstrom (G. Binnig et al. Helvetica Physica Acta, 55, 726 (1982)).

There have been some proposals to record and reproduce projections and recesses, or changes in the electronic state on the order of nanometers on the surface of a recording medium using the principle of the STM (Japanese Patent Application Public Disclosure (Kokai) Nos. 63-161552 (1988) and 63-161553. These documents are priority applications for U.S. patent application Ser. No. 668,399).

In producing a recording/reproducing apparatus using the above-described principle, higher precision than in producing a conventional apparatus is needed. In pursuing higher precision, since the resolution of an observed image depends on the shape of the distal end of a probe used in an STM apparatus, it has become necessary to minimize the influence of distortion of a signal due to a change in the shape of the distal end of the probe in the information recording/reproducing apparatus utilizing the principle of the STM.

SUMMARY OF THE INVENTION

The present invention has been made as a modification of the above-described conventional approach.

It is an object of the present invention to provide an information recording medium and an information recording and/or reproducing method and apparatus which can perform more precise information recording and/or reproducing operations.

To achieve this object, the present invention provides an information recording medium for effecting at least one of recording of information thereon and reproducing of information therefrom using a probe. The recording medium includes a first information region and a second information region. The second information region can be separated from the first information region. The information is recorded on and/or reproduced from the first information region using the probe. Abnormality detection information for detecting an abnormality of the probe is recorded in the second information region, and any abnormality of the probe is detected by detecting the abnormality detection information from the second information region by the probe.

The present invention also provides an information recording and reproducing apparatus for performing at least one of recording of information on and reproducing of information from an information recording medium by a probe. The apparatus includes an information recording and reproducing means for performing at least one of recording of information on and reproducing of information from an information recording and reproducing region on the information recording medium using the probe. The apparatus also includes probe abnormality detection means for detecting an abnormality of the probe by detecting with the probe abnormality detection information from an abnormality detection information region separated from the information recording and reproducing region on the information recording medium.

The present invention further provides an information recording and reproducing method for performing at least one of recording of information on and reproducing of information from an information recording medium by a probe. The method includes the steps of performing at least one of recording of information on and reproducing of information from an information recording and reproducing region on the information recording medium using the probe and detecting an abnormality of the probe by detecting an abnormality detection region separated from the recording and reproducing information region on the information recording medium using the probe.

The present invention further provides an information recording apparatus for recording information on an information recording medium by a probe. The apparatus includes information recording means for recording information in an information recording region on the information recording medium using the probe and probe abnormality detection means for detecting an abnormality of the probe by detecting abnormality detection information from an abnormality detection information region on the information recording medium using the probe.

The present invention further provides an information recording method for recording information on an information recording medium by a probe. The method includes the steps of recording information in an information recording region on the information recording medium by scanning the probe relative to the recording medium and detecting an abnormality of the probe by detecting an abnormality detection information region on the information recording medium using the probe.

The foregoing and other objects and features of the present invention will become more apparent from the following detailed description of the preferred embodiments taken in connection with the accompanying drawings.

DETAILED DESCRIPTION OF THE PREFERRED EMBODIMENTS

Figure 1:
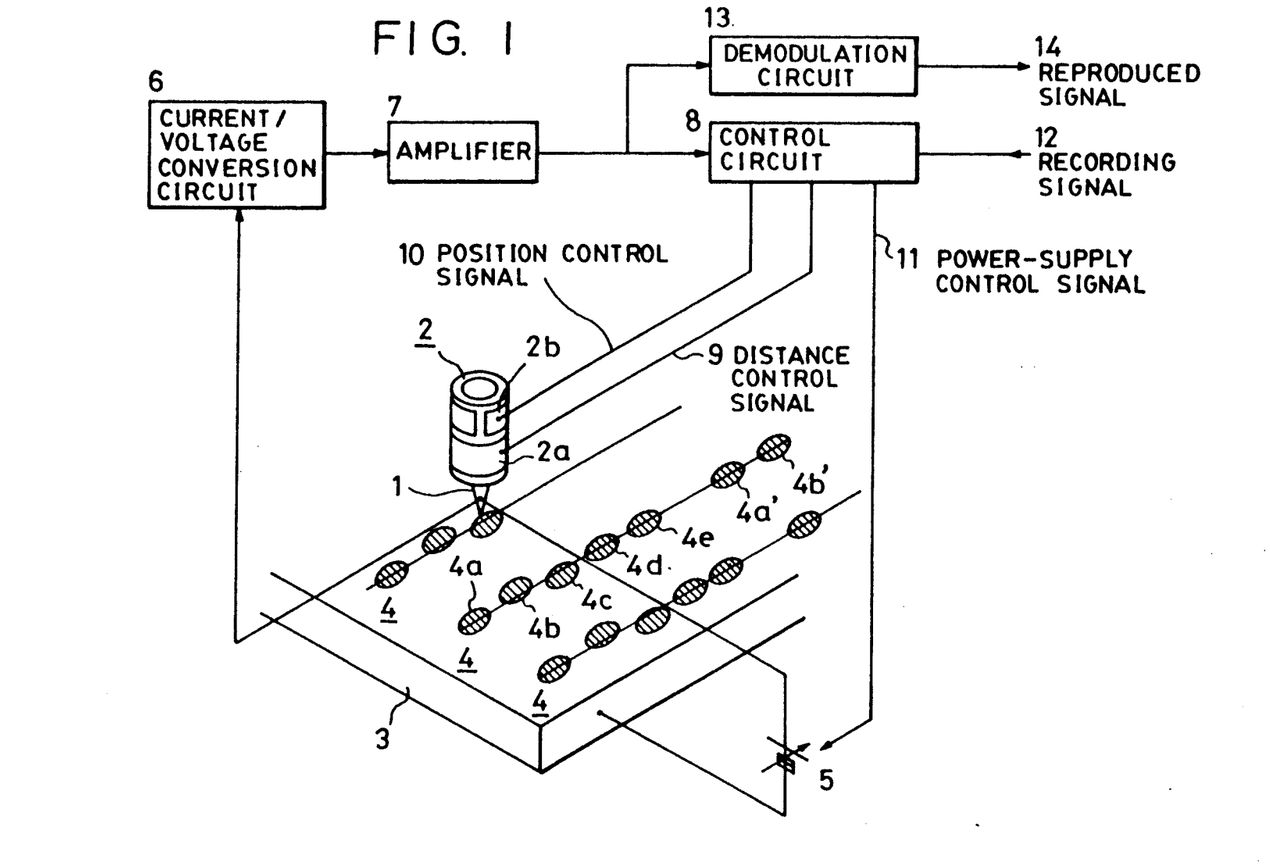
FIG. 1 is a block diagram showing the configuration of an information recording/reproducing apparatus according to a first embodiment of the present invention.

FIG. 1 shows the configuration of an information recording/reproducing apparatus according to a first embodiment of the present invention.

In FIG. 1, a conductive probe 1 is made by mechanically cutting and sharpening platinum. A cylindrical piezoelectric element 2 (for example, refer to G. Binnig and D. P. E. Smith, Rev. Sci. Instrum. 57 (8), August 1986, 1685–1689) serves as a fine driving mechanism for finely driving the probe 1. There is also shown a recording medium 3. Each bit string (track) 4 comprises tracking bits and data bits (to be described later). Although each bit is actually very small, it is shown in an enlarged form in FIG. 1 for the purpose of explanation. The cylindrical piezoelectric element 2 makes the probe 1 scan each recording bit string at a constant speed. At the same time, the probe 1 can access any bit string by means of a coarse driving mechanism (not shown), such as a linear motor or the like.

A variable power supply 5 applies a voltage for recording or reproducing operations between the probe 1 and the recording medium 3. A current/voltage conversion circuit 6 detects current flowing between the probe 1 and the recording medium 3, and converts the value of the detected current into a voltage signal and outputs the voltage signal. An amplifier 7 amplifies the output signal of the current/voltage conversion circuit 6. A control circuit 8 transmits a driving control signal to the fine driving mechanism 2, and also transmits a control signal so that voltage for a recording operation is applied from the variable power supply 5 according to a recording signal from an external apparatus (not shown) in a recording operation, and voltage for a reproducing operation is applied in a reproducing operation. A demodulation circuit 13 demodulates the output signal from the amplifier 7 and outputs the resultant signal to an external apparatus (not shown) as a reproducing signal in a reproducing operation.

In a recording or reproducing operation, a predetermined bias voltage is applied between the probe 1 and the recording medium 3 from the variable power supply 5 by the control of the control circuit 8, and the probe 1 is brought close to the recording medium 3 so that a tunnel current or a field emission current flows therebetween (coarse adjustment). At that time, the control circuit 8 transmits a distance control signal 9 to the fine driving mechanism 2 to gradually move the fine driving mechanism 2 in the direction of the recording medium 3. When the current/voltage conversion circuit 6 has detected a current, the control circuit 8 first stops the fine driving mechanism 2. Subsequently, based on a tunnel current or a field emission current (hereinafter generically termed a tunnel current) detected in a position control process in the direction of height (to be described later), the control circuit 8 transmits a distance control signal 9 so as to expand and contract the fine control mechanism 2 (fine adjustment).

An electrode 2a for an expansion unit expands and contracts the cylindrical piezoelectric element 2 in the direction of the recording medium 3. An electrode 2b for a deformation unit deforms the element 2 in a direction parallel to the surface of the recording medium 3.

As the recording medium 3, a material having a memory effect in its voltage-current switching characteristics is used. For example, an epitaxial-growth surface of gold or a graphite film on a flat substrate made of glass, mica or the like is used as a substrate electrode. As the recording medium 3, squarium-bis-6-octylazulene (hereinafter termed SOAZ) is used. An acculumated layer comprising two monomolecular films of this material is formed on the substrate electrode by a Langmuir-Blodgett's method.

A recording/reproducing operation is performed according to the following principle. The variable power supply 5 continues to apply the bias voltage between the probe 1 and the recording medium 3, which are brought close to each other so that a tunnel current flows therebetween according to the above-described process. A recording operation is performed in the following way: The fine driving mechanism 2 whose electrode 2b has received a position control signal 10 from the control circuit 8 in the above-described operation moves the probe 1 to an arbitrary position on the recording medium 3. A voltage exceeding a threshold voltage for producing an electric memory effect is applied between the probe 1 and the recording medium 3 by modulating the bias voltage from the variable power supply 5 at a desired position on the recording medium 3. A reproducing operation is performed by scanning the recording medium 3 while applying a bias voltage for reading between the probe 1 and the recording medium 3 from the variable power supply 5. More specifically, a bias voltage of about 0.1–1 V (volt) is applied between the probe 1 and the recording medium 3 from the variable power supply 5, and the probe 1 is brought close to the recording medium 3 so that a constant tunnel current (1 pA (picoampere)) flows therebetween. The probe 1 is moved to the desired position on the recording medium 3 in this state, and a pulse voltage of 6 V is applied between the probe 1 and the recording medium 3 by modulating the variable power supply 5 while holding the distance control signal 9. A bit having a diameter of 10 nm (nanometers) whereby a current of 10–100 pA flows is thereby formed. This state is maintained after applying the pulsed voltage. In a reproducing operation, a voltage of 1 V with which an electric memory effect is not produced is applied between the probe 1 and the recording medium 3, and a change in the tunnel current is detected.

An explanation will now be provided of the position control of the probe 1 in a recording/reproducing operation. In the present embodiment, tracking bits for obtaining signals for performing the position control of the probe 1 on the recording medium 3, and data bits where recording information is written are arranged in a spatially separated manner. That is, in FIG. 1, the recorded bits 4 comprise tracking bits 4a, 4b, ... and data bits 4a', 4b', .... The tracking bits comprise respective bits for generating a tracking signal for making the probe 1 move on the track, a distance control signal for adjusting the distance between the probe 1 and the recording medium 3, and an error signal for detecting a change in the shape of the probe 1. In a recording operation, writing (formatting) of tracking bits is first performed on the recording medium 3.

Figures 2A, 2B:
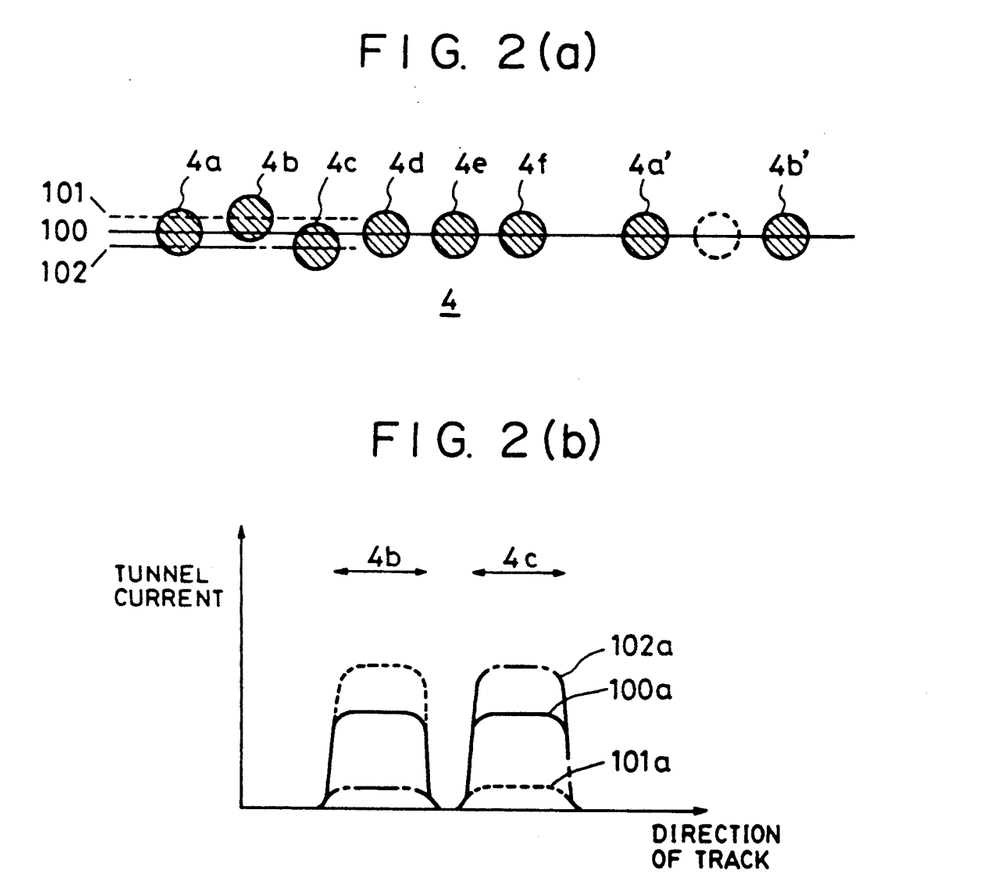
FIG. 2(a) is a diagram illustrating a bit string and scanning positions in the apparatus shown in FIG. 1.
FIG. 2(b) is a diagram illustrating changes in tunnel current at respective scanning positions by a probe in the apparatus shown in FIG. 1.

An explanation will now be provided of the tracking bits 4a, ... with reference to FIGS. 1 and 2(a). FIG. 2(a) is a diagram illustrating the bit string 4. In writing (track formatting) the tracking bits, the cylindrical piezoelectric element 2 is driven by a position control signal from the control circuit 8 via the electrode 2b for two-dimensional scanning so that tracking bits 4b and 4c are written with a deviation of about ¼ × (the size of the bit) to the left and to the right with respect to the center 100 of the track, respectively. Tracking bits 4a, 4d, 4e, 4f, ... are arranged so as to be on the center 100 of the track. The tracking bit 4a functions as a clock bit indicating that data bits start after the tracking bits. Formation of a series of formatting bits is performed by moving the probe 1 over the recording medium 3 by means of the fine driving mechanism 2 and a coarse driving mechanism (not shown).

Figure 2C:
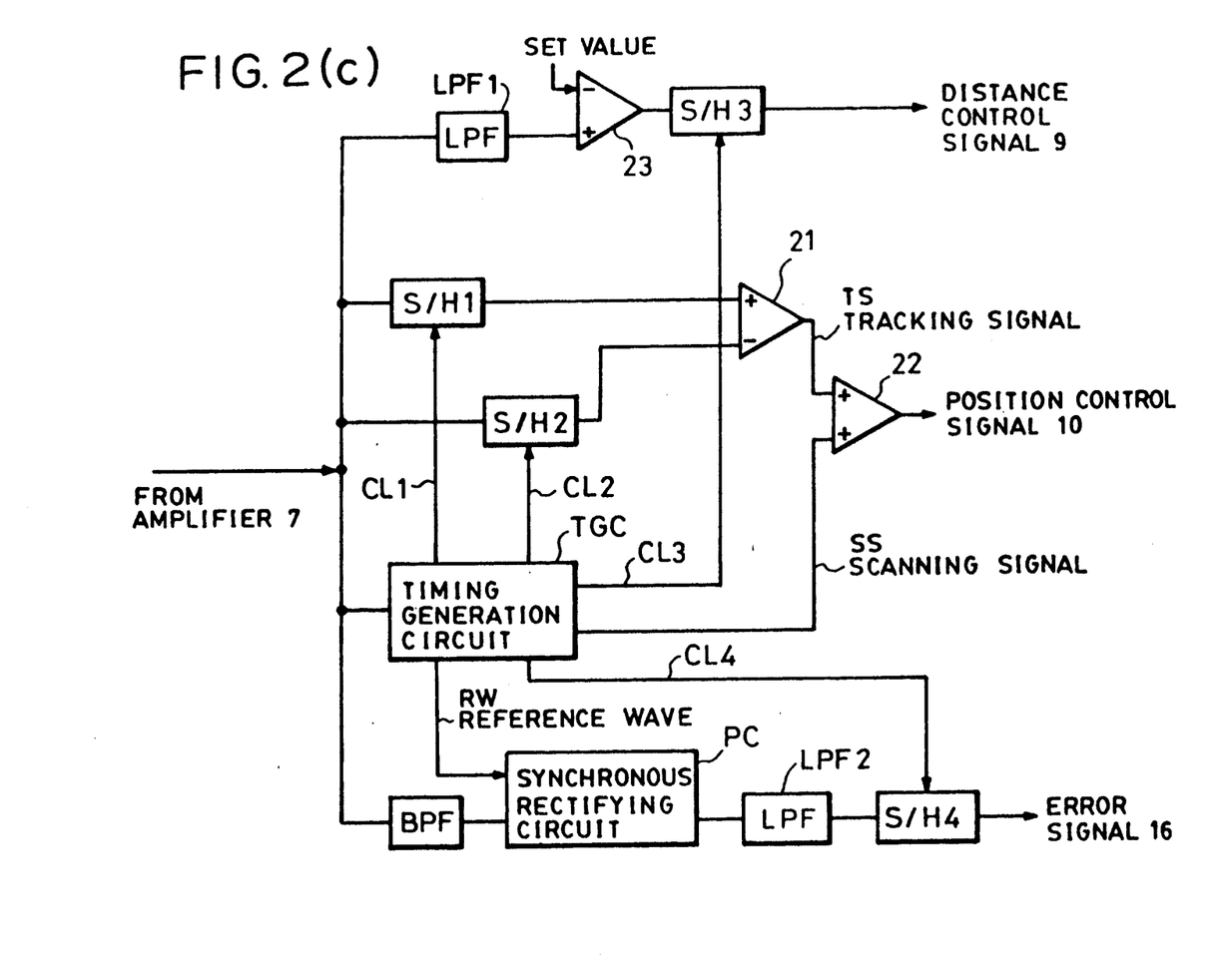
FIGS. 2(c) and 2(d) are diagrams illustrating a control unit and an error processing unit of the apparatus shown in FIG. 1, respectively.

Next, an explanation will be provided of position control using the tracking bits with reference to FIGS. 2(a)-2(c). FIG. 2(b) shows changes in tunnel current at respective scanning positions of the probe 1. FIG. 2(c) is a block diagram showing a control unit in the control circuit 8 for outputting the distance control signal 9, the position control signal 10 and an error signal 16.

Position control in the horizontal direction will be first explained. Tunnel currents when the probe 1 scans the tracking bits 4b and 4c while moving along the track 100 change as indicated by solid lines 100a shown in FIG. 2(b). If the probe 1 deviates from the track and moves along a locus 101 indicated by a broken line shown in FIG. 2(a), the tunnel currents when the probe 1 scans the tracking bits 4b and 4c change as indicated by broken lines 101a shown in FIG. 2(b). If the probe 1 deviates from the track in a direction reverse to the above-described direction and moves along a locus 102 indicated by a one-dot chain line shown in FIG. 2(a), the tunnel currents when the probe 1 scans the tracking bits 4b and 4c change as indicated by one-dot chain lines 102a shown in FIG. 2(b). In FIG. 2(b), ranges indicated by the two-directional arrows are ranges where the bits 4b and 4c are present. As is apparent from FIG. 2(b), a difference in tunnel current for each of the tracking bits 4b and 4c corresponds to the amount and direction of deviation from the center 100 of the track of the probe 1. Hence, by observing the difference, the amount and direction of deviation from the track of the probe 1 can be detected. If the position of the probe 1 in a direction perpendicular to the scanning direction is controlled so that the difference becomes 0, it is possible to perform position control so that the probe 1 always moves along the track. In the control unit shown in FIG. 2(c), a portion for generating the position control signal comprises sample and hold circuits S/H 1 and S/H 2 for sampling and holding signals from the tracking bits 4b and 4c, respectively, a difference generator 21 for generating a difference between outputs from the two sample and hold circuits, and a timing generation circuit TGC for generating scanning signals and sample and hold signals.

The timing generation circuit TGC performs a discrimination between a data-bit region and a tracking-bit region and the start of a timing operation according to an output from the clock bit 4a or the like, and generates clock signals CL1 and CL2 so that signals (position signals) from the amplifier 7 are received in the sample and hold circuits S/H 1 and S/H 2 with the timings of the passage of the probe 1 through the tracking bits 4b and 4c, respectively. The position signals enter the difference generator 21, and a difference signal output from the difference generator 21 becomes a tracking signal TS. The tracking signal is superposed with a scanning signal SS, serving as a control signal for making the probe 1 perform scanning from the timing generation circuit TGC, by a superposer 22, and the resultant signal becomes the position control signal 10. Hence, the subsequent probe scanning moves along the center 100 of the track.

Position control in the direction of height will now be explained. In the present embodiment, signal information from the bits 4d, 4e and 4f provided on the track is compared with a set value, and the distance control signal 9 is generated so that tunnel currents from these bits become constant. More specifically, a signal from the amplifier 7 is input to a low-pass filter LPF 1, which cuts high-frequency signal components, such as frequencies generated by signals corresponding to respective bits during scanning, and outputs the resultant signal. The signal output from the low-pass filter LPF 1 is then converted into a differential signal representing the difference between the signal and the set value by a difference generator 23.

The timing generation circuit TGC generates a clock signal CL3 so that the signal (distance control signal) from the difference generator 23 is received in a sample and hold circuit S/H 3 with a timing immediately before which the probe 1 passes all the bits 4d-4f. The received signal becomes a control signal for expanding or contracting the fine driving mechanism 2 in the direction of the recording medium 3 so that the probe 1 is set at a predetermined height. This distance control signal is subsequently sampled and held by a control signal from the timing generation circuit TGC. Consequently, when the probe 1 is in a data region, the distance control signal is held, and data are recorded/reproduced at a high speed.

Bits for detecting a change in the shape of the probe 1 are included in the tracking bits. In the present embodiment, the bits 4d, 4e, 4f, ... on the track 100 correspond to such bits. These bits are arranged at a certain distance from the clock bit 4a so as to have a certain interval between the bits. Signals from these bits are passed through a band-pass filter BPF which passes only the neighborhood of the generated frequency of corresponding signals of the respective bits being scanned. Subsequently, a synchronous rectifying circuit PC extracts a signal component corresponding to the generated frequency (the spatial frequency of the bit string) of the corresponding signals of the respective bits being scanned using a reference wave RW from the timing generation circuit TGC. A change in the shape of the probe 1 can be detected by extracting the amplitude of this frequency component. That is, if the resolution of the probe 1 decreases, the amplitude of the frequency component corresponding to the spatial frequency of the bits 4d, 4e and 4f on the track 100 decreases. Accordingly, deterioration in the shape of the probe 1 can be detected by extracting the above-described frequency component by the band-pass filter BPF and extracting a change in the amplitude of the frequency component by the synchronous rectifying circuit PC. Noise in the amplitude signal from the synchronous rectifying circuit PC is removed by a low-pass filter LPF 2. The output of the low-pass filter LPF 2 is received in a sample and hold circuit S/H 4 in synchronization with a clock signal CL4 generated by the timing generation circuit TGC with a timing immediately before which the probe 1 passes all the bits 4d-4f. This amplitude signal is updated every time the clock bit 4a enters as the error signal 16.

If a change in the shape of the distal end of the probe 1 happens, a recording or reproducing operation cannot be performed with high precision and the resolution of current detection by the probe 1 is reduced, so that tracking is not correctly performed because an erroneous signal is generated in the position control signal or the distance control signal. Hence, the control circuit 8 monitors the error signal 16, and performs error processing, such as recovery of the shape of the probe 1 (the probe 1 is brought to a known probe shape recovery apparatus where a recovery operation is performed), replacement of the probe using a plurality of probes, or the like when a change in the shape of the probe 1 is pronounced, that is, a change in the error signal is greater than a predetermined value. An error may be announced by means of an alarm, a display or the like.

Figure 2D:
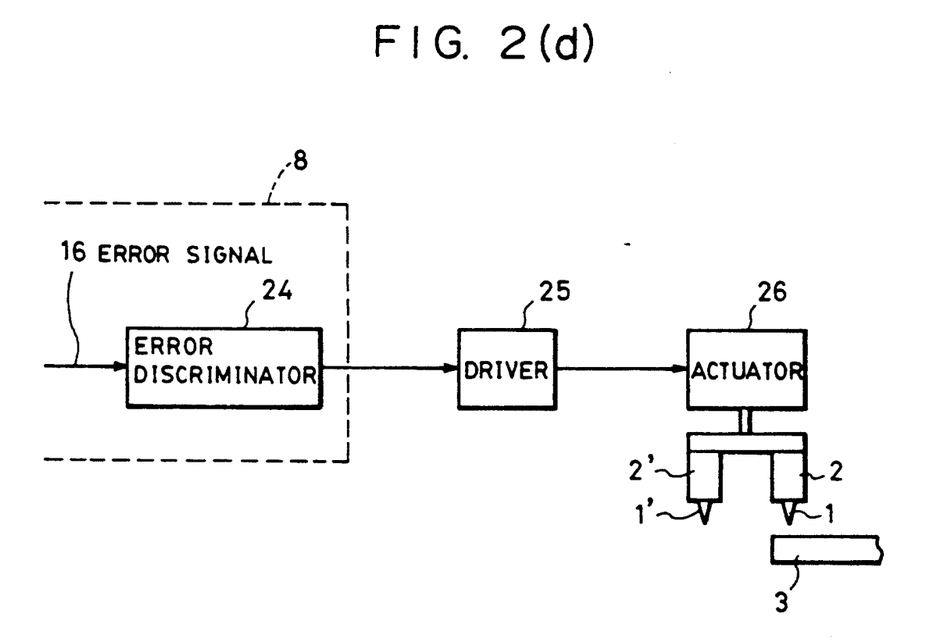

FIG. 2(d) is a schematic diagram illustrating an error processing unit. In FIG. 2(d), an error discriminator 24 discriminates that an error is present if a change in the error signal 16 has at least a predetermined value. A driver 25 drives an actuator 26 when an error has been discriminated by the error discriminator 24. The actuator 26 supports the fine driving mechanism 2 and the probe 1, and a spare fine driving mechanism 2' and a probe 1' having entirely the same configuration as the fine driving mechanism 2 and the probe 1. If an error is detected in the probe 1 being used, the probe 1 is replaced by the probe 1' together with the fine driving mechanism 2'.

In order to perform a recording operation, already-recorded tracking bits 4a ... are rescanned, and the position control of the probe 1 is performed according to a signal obtained in this rescanning operation. If the timing generation circuit TGC has determined that the probe 1 has entered a data region on the recording medium 2, recording of data bits (4a', 4b', ...) is performed by controlling the variable power supply 5 in accordance with the recording signal 14 while holding the control signals 9 and 10 for position control. In order to perform a reproducing operation, after moving the probe 1 to a desired recording bit string by means of the fine driving mechanism 2 and the coarse driving mechanism, the position control of the probe 1 is performed in the same manner as in the recording operation. If the timing generation circuit TGC has determined that the probe 1 has entered a data region, a reproduced signal 14 is obtained by detecting a change in the tunnel current from the data region on the recording medium 3, and using a demodulation circuit 13, such as a binary circuit.

Figure 3:
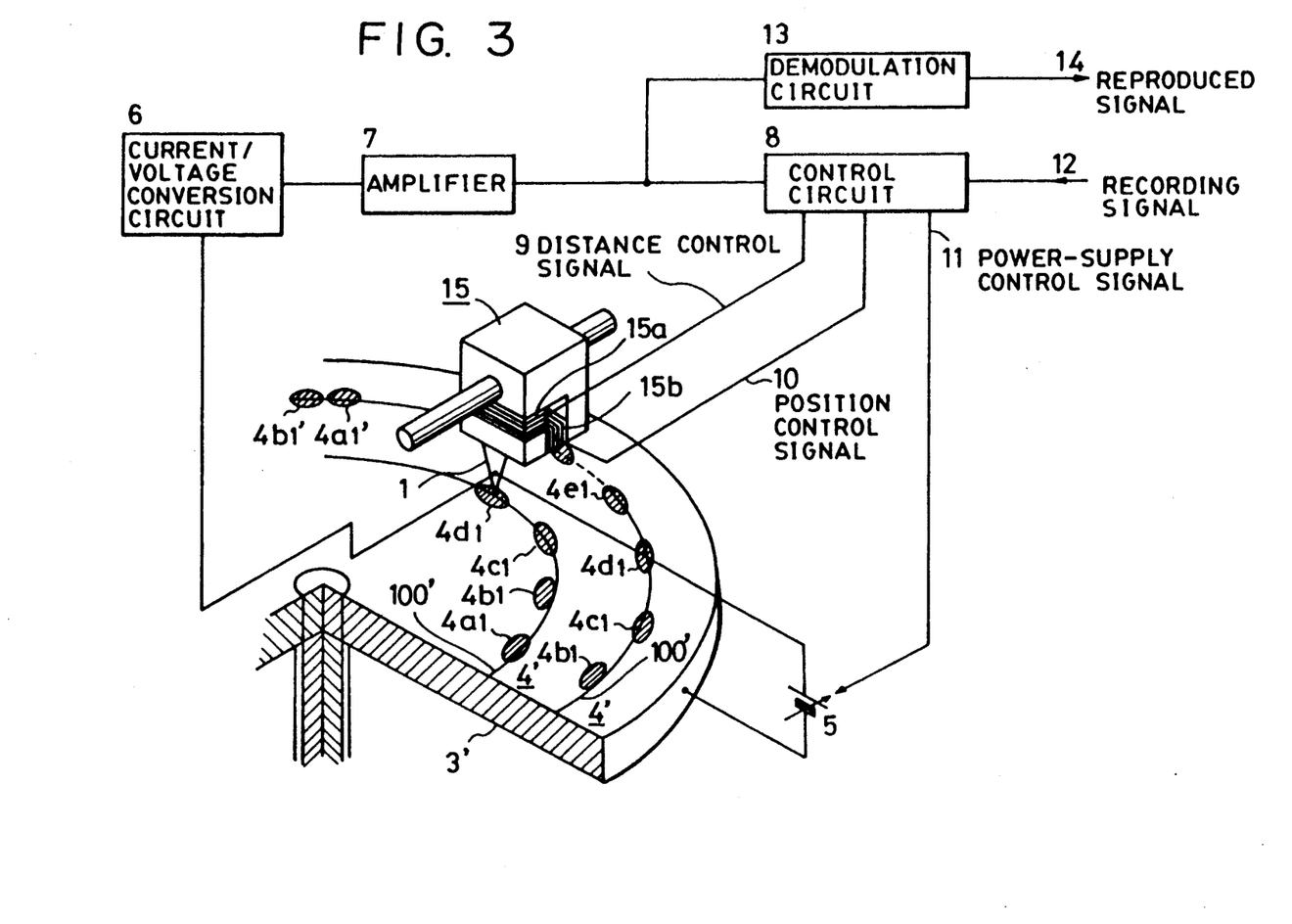
FIG. 3 is a block diagram showing the configuration of an information recording/reproducing apparatus according to a second embodiment of the present invention.

FIG. 3 shows a second embodiment of the present invention. First, a recording medium 3' will be explained. In the present embodiment, an amorphous metal formed by a rapid quenching method is used as a material for the recording medium 3'. More specifically, Rh-Zr which is a kind of alloy glass is used. The amorphous metal has a sufficient flatness (0.1 nm rms or less) so as to be used in the present embodiment by being processed by physical etching using Ar+ ions or the like.

The recording medium 3' is rotated by a driving means (not shown), such as a motor or the like, at a constant angular velocity or a constant linear velocity. As in the first embodiment, a variable power supply 5 applies a bias voltage of about 0.1-1 V between a probe 1 and the recording medium 3'. A control circuit 8 controls a piezoelectric element 15a for distance adjustment by outputting a distance control signal 9 so that a tunnel current flowing between the probe 1 and the recording medium 3' becomes constant.

The probe 1 facing the recording medium 3' comprises electropolished tungsten having a distal-end radius R of 0.1 μm or less. A piezoelectric element 15b for position control drives the probe 1 in the direction of the radius of the rotation.

A recording method will now be explained. After applying a voltage of 1.0 V between the recording medium 3' and the probe 1 from the variable power supply 5, a current of 200 nA, which is much larger than a usual tunnel current of 1nA flowing between a recording medium and a probe when a sample is observed by an STM, flows, and the value of the current is returned again to 1 nA. The surface of the amorphous metal is fused due to the Joule heat, and forms a bit by being attracted by a strong electrostatic force between the recording medium 3' and the probe 1. The size of the bit was estimated to be 20 nm in diameter and 5 nm in height.

Next, a reproducing method will be explained. In a reproducing operation, after moving the probe 1 to a desired recording bit string by a driving mechanism (not shown), the recording bit string on the surface of the recording medium 3+ is scanned, and a change in tunnel current due to the presence of respective bits is detected.

Also, in the present embodiment, the same probe position control as in the first embodiment is performed. That is, tracking bits for obtaining tracking signals for performing the position control of the probe 1 on the recording medium 3', and data bits where recording information is written are arranged in a spatially separated manner. More specifically, in FIG. 3, the recorded bits 4' comprise tracking bits $4a_1$, $4b_1$, ... and data bits $4a_1'$, $4b_1'$, .... These bits are arranged substantially in a circumferential direction. The tracking bits generate a tracking signal for making the probe 1 move on the track, a distance control signal for adjusting the distance between the probe 1 and the recording medium 3', and an error signal for detecting a change in the shape of the probe 1. In a recording operation, writing (formatting) of tracking bits is first performed on the recording medium 3'. The tracking bits have the same configuration as in the first embodiment.

That is, in the formatting operation, the piezoelectric element 15b for position control is driven by controlling a position control signal 10 so that tracking bits $4b_1$ and $4c_1$ deviate about ¼×(the size of the bit) to the left and to the right in the direction of the radius with respect to the center 100' of the track, respectively. Tracking bits $4a_1$, $4e_1$, $4f_1$, ... are arranged so as to be on the center 100' of the track. The tracking bit $4a_1$ functions as a clock bit indicating that data bits start after the tracking bits. Formation of a series of formatting bits is performed by moving the probe 1 over the recording medium 3' by means of the fine driving mechanism 15 and a coarse driving mechanism (not shown).

Thus, formatting bits are formed, and a distance control signal 9, a position control signal 10 and an error signal 16 (not shown) are generated using the same control circuit as in the first embodiment.

In an actual recording operation, data bits $4a_1'$, $4b_1'$, ... are recorded in a data region on the recording medium $3'$ by controlling the variable power supply 5 in accordance with a recording signal 12 while performing the position control of the probe 1 according to signals from the tracking bits $4a_1$, .... In a reproducing operation, after moving the probe 1 to a desired recording bit string by means of the fine driving mechanism 15 and the coarse driving mechanism, a reproduced signal 14 is obtained by detecting a change in the tunnel current from a data region on the recording medium $3'$ while performing the position control of the probe 1 in the same manner as in the recording operation, and using a demodulation circuit 13, such as a binary circuit. An error processing unit has the same configuration as in the first embodiment.

Although, in the present embodiment, an amorphous metal is used as the preferred material for the recording medium $3'$, the same effects may also be obtained by using a conductive material whose surface shape changes by modulating the tunnel current, or accumulating a metal film by modulating the tunnel current in the atmosphere of an organometallic gas.

Although, in the above-described embodiments, a bit string arranged with a constant interval is used as bits for detecting a change in the shape of the probe, the same effects may also be obtained by using, for example, bits having a known shape provided that the bits can detect a change in the shape of the probe. Alternatively, bits for detecting a change in the shape of the probe may be provided separately from bits for detecting the interval.

Although, in the above-described embodiments, recording/reproducing apparatuses are illustrated, the present invention may, of course, be applied to any apparatus having a function of performing only a recording, reproducing or an erasing (recording 0 information) operation, or having a function obtained by combining any two of the above-described functions.

In the above-described embodiments, an information recording medium, where information is recorded and/or reproduced by a probe performing relative scanning, includes an information region for detecting an abnormality of the shape of the probe, which is provided separated from a region where the information is recorded and/or reproduced.

And in the above-described embodiments, an information recording and/or reproducing method for recording information on an information recording medium and/or reproducing information from the information recording medium while relatively scanning the information recording medium by a probe includes a step of detecting an abnormality of the probe by detecting a predetermined information region separated from a region where the information is recorded and/or reproduced on the information recording medium.

And in the above-described embodiments, an information recording and/or reproducing apparatus for recording information on an information recording medium and/or reproducing information from the information recording medium while relatively scanning the information recording medium by a probe includes an abnormality detection means for detecting an abnormality of the probe according to a result of detection when a predetermined information region separated from a region where the information is recorded and/or reproduced on the information recording medium is detected by the probe.

As described above, according to the foregoing embodiments, deterioration in the shape of the probe can be easily detected, and it thereby becomes possible to perform more precise information recording and/or reproducing operations.

The individual components shown in outline or designated by blocks in the drawings are all well-known in the information recording arts and their specific construction and operation are not critical to the operation or best mode for carrying out the invention.

While the present invention has been described with respect to what is presently considered to be the preferred embodiments, it is to be understood that the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording medium for effecting at least one of recording of information thereon and reproducing of information therefrom using a probe, said recording medium comprising:

a first information region, the information being recorded on and/or reproduced from said first information region using the probe; and a second information region separated from said first information region, detection information for detecting an abnormality of the probe being recorded in said second information region, and any abnormality of the probe being detected by detecting the information from said second information region by the probe.

2. An information recording medium according to claim 1, wherein said first information region comprises information bits corresponding to information to be recorded, and said second information region comprises abnormality detection bits for detecting an abnormality of the probe.

3. An information recording medium according to claim 2, wherein said second information region further comprises tracking bits for tracking the information bits by the probe.

4. An information recording medium according to claim 2, wherein said information bits and said abnormality detection bits are linearly arranged.

5. An information recording medium according to claim 2, wherein said information bits and said abnormality detection bits are arcuately.

6. An information recording and reproducing apparatus for performing at least one of recording of information on and reproducing of information from an information recording medium by a probe, said apparatus comprising:

information recording and reproducing means for performing at least one of recording of information on and reproducing information from an information recording and reproducing region on the information recording medium using the probe; and probe abnormality detection means for detecting an abnormality of the probe by detecting with the probe abnormality detection information from an abnormality detection information region separated from the information recording and reproducing region on the information recording medium.

7. An apparatus according to claim 6, wherein said information recording and reproducing means comprises means for performing at least one of recording and reproducing the information while relatively scanning the recording medium by the probe.

8. An apparatus according to claim 6, wherein said probe abnormality detection means detects abnormality of the probe according to an abnormality detection signal detected by the probe and generated by detecting abnormality detection information bits formed in the abnormality detection information region.

9. An apparatus according to claim 8, wherein said probe abnormality detection means determines abnormality of the probe according to the amplitude of the abnormality detection signal.

10. An apparatus according to claim 6, further comprising probe replacing means for replacing the probe with a spare probe according to a result of the detection by said probe abnormality detection means.

11. An information recording and reproducing method for performing at least one of recording of information on and reproducing of information from an information recording medium by a probe, said method comprising the steps of:
performing at least one of recording of information on and reproducing of information from an information recording and reproducing region on the information recording medium using the probe; and
detecting an abnormality of the probe by detecting an abnormality detection information region separated from the recording and reproducing information region on the information recording medium using the probe.

12. A method according to claim 11, wherein said information recording and/or reproducing step is performed while relatively scanning the information recording medium by the probe.

13. A method according to claim 11, wherein said probe abnormality detection step is performed according to an abnormality detection signal detected by the probe and generated by detecting abnormality detection information bits formed in the abnormality detection information region.

14. A method according to claim 13, wherein said probe abnormality detection step comprises determining abnormality of the probe according to the amplitude of the abnormality detection signal.

15. A method according to claim 11, further comprising a probe replacing step for replacing the probe with a spare probe according to a result of the detection in said probe abnormality detection step.

16. An information recording medium for effecting at least one of recording of information thereon and reproducing of information therefrom using a probe, said recording medium comprising:
a first information region, the information being recorded on and/or reproduced from said first information region using the probe; and
a second information region, abnormality detection information for detecting an abnormality of the probe being recorded in said second information region, and any abnormality of the probe being detected by detecting the abnormality detection information from said second information region by the probe.

17. An information recording medium according to claim 16, wherein said information region comprises information bits corresponding to information to be recorded, and said second information region comprises abnormality detection bits for detecting an abnormality of the probe.

18. An information recording medium according to claim 17, wherein said second information region further comprises tracking bits for tracking the information bits by the probe.

19. An information recording medium according to claim 17, wherein said information bits and said abnormality detection bits are linearly arranged.

20. An information recording medium according to claim 17, wherein said information bits and said abnormality detection bits are arcuately arranged.

21. An information recording apparatus for recording information on an information recording medium by a probe, said apparatus comprising:
information recording means for recording information in an information recording region on the information recording medium using the probe; and
probe abnormality detection means for detecting an abnormality of the probe by detecting abnormality detection information from an abnormality detection information region on the information recording medium using the probe.

22. An apparatus according to claim 21, wherein said information recording means records the information while relatively scanning the information recording medium by the probe.

23. An apparatus according to claim 21, wherein said probe abnormality detection means detects abnormality of the probe according to an abnormality detection signal detected by the probe and generated by detecting abnormality detection information bits formed in the abnormality detection information region.

24. An apparatus according to claim 23, wherein said probe abnormality detection means determines abnormality of the probe according to the amplitude of the abnormality detection signal.

25. An apparatus according to claim 21, further comprising probe replacing means for replacing the probe with a spare probe according to a result of the detection by said probe abnormality detection means.

26. An information recording method for recording information on an information recording medium by a probe, said method comprising the steps of:
recording information in an information recording region on the information recording medium by scanning the probe relative to the recording medium; and
detecting an abnormality of the probe by detecting an abnormality detection information region on the information recording medium using the probe.

27. A method according to claim 26, wherein said information recording step is performed while relatively scanning the information recording medium by the probe in one of an arcuate and a linear direction.

28. A method according to claim 26, wherein said probe abnormality detection step is performed according to an abnormality detection signal detected by the probe and generated by detecting abnormality detection information bits formed in the abnormality detection information region.

29. A method according to claim 28, wherein said probe abnormality detection step comprises determining abnormality of the probe according to the amplitude of the abnormality detection signal.

30. A method according to claim 26, further comprising a probe replacing step for replacing the probe with a spare probe according to a result of the detection in said probe abnormality detection step.

* * * * *